United States Patent [19]
Glass et al.

[11] Patent Number: 5,617,207
[45] Date of Patent: Apr. 1, 1997

[54] APPARTATUS AND METHOD FOR MEASURING A CHANGE IN AN ENERGY PATH LENGTH

[75] Inventors: Monty Glass, Dulwich Hill; Timothy P. Dabbs, West Ryde, both of Australia

[73] Assignee: Commonwealth Scientific and Industrial Research Organisation, Australian Capital Territory, Australia

[21] Appl. No.: 938,165

[22] PCT Filed: Apr. 23, 1991

[86] PCT No.: PCT/AU91/00154

§ 371 Date: Dec. 4, 1992

§ 102(e) Date: Dec. 4, 1992

[87] PCT Pub. No.: WO91/16597

PCT Pub. Date: Oct. 31, 1991

[30] Foreign Application Priority Data

Apr. 23, 1990 [AU] Australia .................. PJ9777
Feb. 21, 1991 [AU] Australia .................. PK4716

[51] Int. Cl.$^6$ ...................... G01B 9/02
[52] U.S. Cl. .............. 356/345; 356/360; 250/227.27
[58] Field of Search .................. 356/345, 349, 356/358, 359, 360; 250/227.19, 227.27; 385/12, 14

[56] References Cited

U.S. PATENT DOCUMENTS

| | | | |
|---|---|---|---|
| 3,647,275 | 3/1972 | Ward | 350/3.5 |
| 4,313,185 | 1/1982 | Chovan | 367/149 |
| 4,759,627 | 7/1988 | Thylen et al. | 356/345 |
| 4,941,744 | 7/1990 | Yokokura | 356/358 |
| 5,106,191 | 4/1992 | Ohtsuka | 356/358 |
| 5,161,053 | 11/1992 | Dabbs | 359/384 |
| 5,359,415 | 10/1994 | Tabarelli | 356/358 |

FOREIGN PATENT DOCUMENTS

| | | |
|---|---|---|
| 0058801 | 9/1982 | European Pat. Off. |
| 3623265 | 1/1988 | Germany |
| 3709253 | 9/1988 | Germany |
| 2173592 | 10/1986 | United Kingdom |
| 90/11484 | 10/1990 | WIPO |

*Primary Examiner*—Georgia Y. Epps
*Assistant Examiner*—Robert Kim
*Attorney, Agent, or Firm*—Foley & Lardner

[57] ABSTRACT

Apparatus and method for measuring a change in an energy path length are disclosed. One broad embodiment disclosed is an apparatus for measuring a change in an energy path length comprising an energy source (301) having means (302, 307) for emanating a first energy beam, substantially uncollimated, wherein at least a portion of the first energy beam is substantially coherent and having means (327) for coherently guiding a second energy beam to an energy interferometer, a coherent energy director (310), an energy collector (317), wherein the energy director (310) is operatively associated with the means for emanating and the collector (317) thereby coherently directing at least a portion of the first energy beam from the means (302, 307) for emanating to the collector (317), wherein the collector (317) is operatively associated with the interferometer thereby coherently directing at least a portion of the collected first energy beam to the interferometer whereby the collected first energy beam interferes with the second energy beam thereby producing an output signal, means (333) for changing the energy path length of the first energy beam between the means (302, 307) for emanating and the director (310), the means (333) for changing being operatively associated with the first energy beam emanator, and a calculator (319) operatively associated with the interferometer to determine the change in the energy path length from a change in the output signal.

26 Claims, 6 Drawing Sheets

APPARATUS AND METHOD FOR MEASURING A CHANGE IN AN ENERGY PATH LENGTH

TECHNICAL FIELD

This invention relates to apparatuses and methods for measuring a change in an energy path length.

BACKGROUND ART

The Mach-Zehnder interferometer is one of the most popular configurations for high resolution fibre optic sensors (FIG. 1). In this type of optical fibre sensor, light from coherent source 100 is injected into single mode fibre 101. This light is directed into two fibres by coupler 102; the reference fibre 103 and the signal fibre 104. The light from these two fibres is recombined by coupler 105 where optical interference takes place and is monitored by detectors 106 and 107. The signals at detectors are changed if the optical path length in one arm (the signal arm 104) of the interferometer changes with respect to the other (the reference arm 105). There are two basic ways of changing the path length; intrinsic or extrinsic. For an intrinsic fibre optic interferometer the signal fibre itself is stretched for example by piezoelectric cylinder 108 (or heated etc) to change the path length, so the light never has to leave the fibre. For the extrinsic fibre optic interferometer, light leaves the fibre, is collimated, passes through a measurement cell where optical path length changes and is then focussed back into the fibre. Typically, Mach-Zehnder interferometer sensors measure temperature, pressure, sound, acceleration, limited displacement, chemical species concentration etc.

It is usual to use a Michelson interferometer (FIG. 2) to measure displacements, particularly if the displacement is relatively large. Coherent light from laser 200 passes along single mode fibre 201 to coupler 202. Light travels along signal fibre 203, leaves the fibre at end 204 and is collimated by lens 205. This light subsequently is reflected by flat reflector 206 back to lens 205 and thence back into the core of fibre 203 at fibre end 204. This back reflected light interferes in coupler 202 with the reference light reflected from mirrored end 207 of fibre 208. The intensity resulting from the interference of these two beams in coupler 202 passes along fibre 209 and is detected by detector 210. In prior interferometers, the fibre-lens combination is moved as a unit relative to reflector 206 for example by piezoelectric stack 211 which consequently changes the optical path length in the signal arm.

OBJECTS OF INVENTION

Objects of this invention are to provide apparatuses and methods for measuring a change in an energy path length.

DISCLOSURE OF INVENTION

For a discussion of "interfere" and "interferes" in accordance with the intended meaning in this specification reference is made to Principles of Optics, Max Born and M. L. Wolf, Pergamon Press, 6th Corrected edition, reprinted 1984 Chapters VII and X, the contents of which are incorporated herein by cross reference.

According to a first embodiment of this invention there is provided an apparatus for measuring a change in an energy path length comprising:

an energy source having means for emanating a first energy beam, substantially uncollimated, wherein at least a portion of the first energy beam is substantially coherent and having means for coherently guiding a second energy beam to an energy interferometer;

a coherent energy director;

an energy collector;

wherein the energy director is operatively associated with the means for emanating and the collector thereby coherently directing at least a portion of the first energy beam from the means for emanating to the collector;

wherein the collector is operatively associated with the interferometer thereby coherently directing at least a portion of the collected first energy beam to the interferometer whereby the collected first energy beam interferes with the second energy beam thereby producing an output signal;

means for changing the energy path length of the first energy beam between the means for emanating and the director, the means for changing being operatively associated with the first energy beam emanator; and a calculator operatively associated with the interferometer to determine the change in the energy path length from a change in the output signal.

According to a second embodiment of this invention there is provided an apparatus for measuring a change in an energy path length comprising:

an energy source having means for emanating a first energy beam wherein at least a portion of the first energy beam is substantially coherent and having means for coherently guiding a second energy beam to an energy interferometer;

a coherent energy director;

an energy collector;

wherein the energy director is operatively associated with the means for emanating and the collector thereby coherently directing, as a substantially uncollimated beam, at least a portion of the first energy beam from the means for emanating to the collector;

wherein the collector is operatively associated with the interferometer thereby coherently directing at least a portion of the collected first energy beam to the interferometer whereby the collected first energy beam interferes with the second energy beam thereby producing an output signal;

means for changing the energy path length of the first energy beam between the director and the collector the means for changing being operatively associated with the collector; and a calculator operatively associated with the interferometer to determine the change in the energy path length from a change in the output signal.

According to a third embodiment of this invention there is provided an apparatus for measuring a change in an energy path length comprising:

an energy source having means for emanating a first energy beam, substantially uncollimated, wherein at least a portion of the first energy beam is substantially coherent and having means for coherently guiding a second energy beam to an energy interferometer;

a coherent energy director;

an energy collector;

wherein the energy director is operatively associated with the means for emanating and the collector thereby coherently directing, as a substantially uncollimated beam, at least a portion of the first energy beam from the means for emanating to the collector;

wherein the collector is operatively associated with the interferometer thereby coherently directing at least a portion of the collected first energy beam to the interferometer whereby the collected first energy beam interferes with the second energy beam thereby producing an output signal;

means for changing the energy path length of the first energy beam between the means for emanating and the director, the means for changing being operatively associated with the first energy beam emanator;

means for changing the energy path length of the first energy beam between the director and the collector the means for changing being operatively associated with the collector; and a calculator operatively associated with the interferometer to determine the change in the energy path length from a change in the output signal.

The energy source can provide a solid particle beam, such as a neutron, proton or electron beam or a beam of alpha particles, acoustic waves, such as sound waves, or electromagnetic radiation, such as gamma rays, x-rays, UV light, visible light, infrared light or microwaves. Generally the energy source is a source of electromagnetic radiation with a wavelength in the range of and including far UV to far IR and the energy guide is an optical fibre.

Examples of light sources include incandescent sources, such as tungsten filament source, vapour lamps such as halogen lamps including sodium and iodine vapour lamps, discharge lamps such as xenon arc lamp and a Hg arc lamp, solid state light sources such as photo diodes, super radiant diodes, light emitting diodes, laser diodes, electroluminiscent light sources, laser light sources including rare gas lasers such as an argon laser, argon/krypton laser, neon laser, helium neon laser, xenon laser and krypton laser, carbon monoxide and carbon dioxide lasers, metal ion lasers such as cadmium, zinc, mercury or selenium ion lasers, lead salt lasers, metal vapour lasers such as copper and gold vapour lasers, nitrogen lasers, ruby lasers, iodine lasers, neodymium glass and neodymium YAG lasers, dye lasers such as a dye laser employing rhodamine 640, Kiton Red 620 or rhodamine 590 dye, and a doped fibre laser.

The means for emanating may be the exit window of an energy source, a laser or laser diode or a pinhole aperture in combination with a focussing element. Alternatively, the energy source may be operatively associated with an energy guide wherein the means for emanating is an energy exit portion of the guide such as an aperture or bend.

The means for coherently guiding the second energy beam may be an energy guide or a focussing system.

The coherent energy director may be an energy condenser or focusser including a virtual focusser.

The focussing system or focusser can be refractive lenses, including microscope objectives, reflective lenses, and/or holographic optical elements. If the energy is of a frequency other than in the range of UV to near infrared light or other types of energies, analogous focussing elements are used in place of the optical focussing elements.

The energy collector may be an aperture or the energy entrance portion of an energy guide operatively associated with the interferometer to coherently guide collected energy to the interferometer for example.

The energy guide can be flexible and can be an energy fibre.

The energy guide can be a flexible, multi mode optical fibre.

The energy guide can be a flexible, single mode optical fibre. For example, a five micron core fibre which is single mode at a wave length of 633 nanometers given an appropriate refractive index profile. A step index optical fibre becomes single mode when the numerical aperture, NA, the fibre core radius, a, and the wave length of light, $\lambda$, obey the relationship:

$$2 \times \pi \times NA \times a / \lambda \leq 2.405.$$

The energy guide may be a coherent fibre bundle.

The energy interferometer may be an energy splitter or the detecting element of a detector, for example.

The energy splitter may be an energy guide coupler such as an optical fibre coupler or a bulk optic splitter. The optical fibre coupler may be a fused biconical taper coupler, a polished block coupler, a bottled and etched coupler or a bulk optics type coupler with fibre entrance and exit pigtails, a planar waveguide device based on photolithographic or ion-diffusion fabrication techniques or other like coupler.

The means for changing the energy path between the means for emanating and the director or changing the energy path between the director and the collector or both may be a scanner or a substance that changes the refractive index in the path of the illuminating light for example.

The scanner can be a piezoelectric stack, a magnetic core/magnetic coil combination, a mechanical vibrator, an electromechanical vibrator, a mechanical or electromechanical scanning mechanism such as a servomotor, an acoustic coupler electrooptic scanning means or any other suitable means.

Typically a parameter measuring interferometer cell comprises:

a first coherence maintaining energy guide which, in operation, has energy emerging coherently from its exit end;

an energy focusser;

the first energy guide being operatively associated with the energy focusser so that at least a portion of the energy emerging from the exit portion of the first energy guide is collected coherently by the energy focusser;

a second coherence maintaining energy guide comprising an energy entrance end; the second energy guide being operatively associated with the energy focusser so that at least a portion of the energy collected by the energy focusser is focussed coherently into the core of the second energy guide;

the first energy guide exit end or the second energy guide entrance end being translated by the parameter to be measured resulting in a change in the energy path between the energy exit end and the focusser or the focusser and the energy entrance end respectively.

Note that the first and second coherence maintaining energy guides may be the same energy guide in which case the focusser would typically include a reflector.

Energy emerging coherently from the exit end of the first energy guide may be directed towards the focusser as a result of reflection, refraction, diffraction, scattering, for example.

The calculator may include optical electrical optoelectronic mechanical or magnetic elements, for example, or may include such techniques as optical and electrically heterodyning, quadrature operation multi area detectors or phase lock loop techniques, for example.

According to a fourth embodiment of this invention there is provided a method for measuring a change in an energy path length comprising:

coherently directing, with an energy director, at least a portion of a first energy beam, wherein at least a portion of the first energy beam is substantially coherent, from means for emanating the first energy beam from an energy source, the first energy beam from the means for emanating being substantially uncollimated, to an energy collector and coherently guiding a second energy beam from the energy source to an energy interferometer;

coherently directing at least a portion of the collected first energy beam to the interferometer whereby the collected first energy beam interferes with the second energy beam thereby producing an output signal;

changing the energy path length of the first energy beam between the means for emanating and the director whereby the output signal changes; and determining the change in the energy path length from the change in the output signal.

According to a fifth embodiment of this invention there is provided a method for measuring a change in an energy path length comprising:

coherently directing, with an energy director, at least a portion of a first energy beam, wherein at least a portion of the first energy beam is substantially coherent, from means for emanating the first energy beam from an energy source to an energy collector, the first energy beam from the director to the collector being substantially uncollimated, and coherently guiding a second energy beam from the energy source to an energy interferometer;

coherently directing at least a portion of the collected first energy beam to the interferometer whereby the collected first energy beam interferes with the second energy beam thereby producing an output signal;

changing the energy path length of the first energy beam between the director and the collector whereby the output signal changes; and determining the change in the energy path length from the change in the output signal.

According to a sixth embodiment of this invention there is provided a method for measuring a change in an energy path length comprising:

coherently directing, with an energy director, at least a portion of a first energy beam, wherein at least a portion of the first energy beam is substantially coherent, from means for emanating the first energy beam from an energy source, the first energy beam from the means for emanating being substantially uncollimated, to an energy collector, the first energy beam from the director to the collector being substantially uncollimated, and coherently guiding a second energy beam from the energy source to an energy interferometer;

coherently directing at least a portion of the collected first energy beam to the interferometer whereby the collected first energy beam interferes with the second energy beam thereby producing an output signal;

changing the energy path length of the first energy beam between the means for emanating and the director and between the director and the collector whereby the output signal changes; and determining the change in the energy path length from the change in the output signal.

BEST MODE AND OTHER MODES FOR CARRYING OUT THE INVENTION

Figure 1:
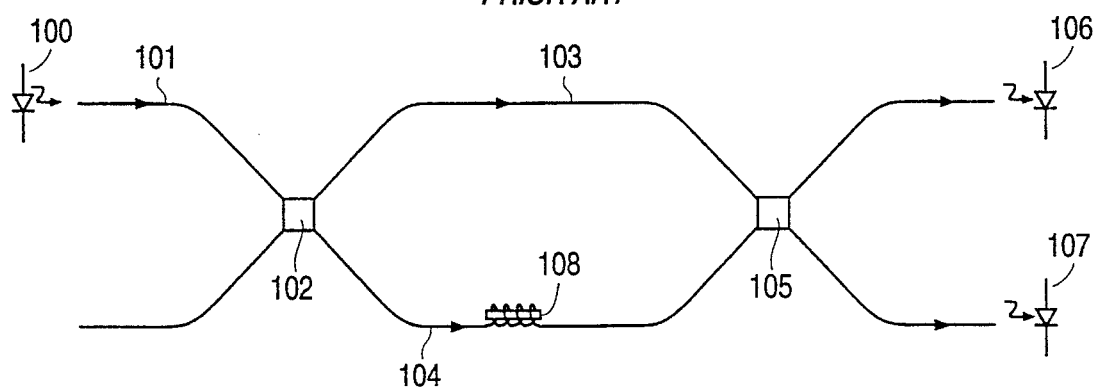
FIG. 1 is a schematic diagram of a typical Mach-Zehnder interferometer.
Figure 2:
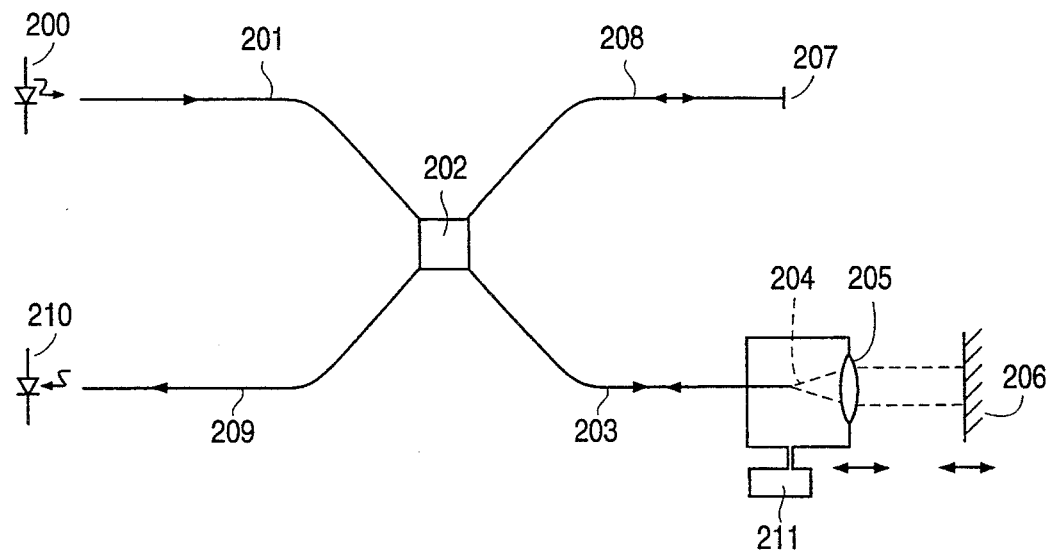
FIG. 2 is a schematic diagram of a typical Michelson interferometer.
Figure 3:
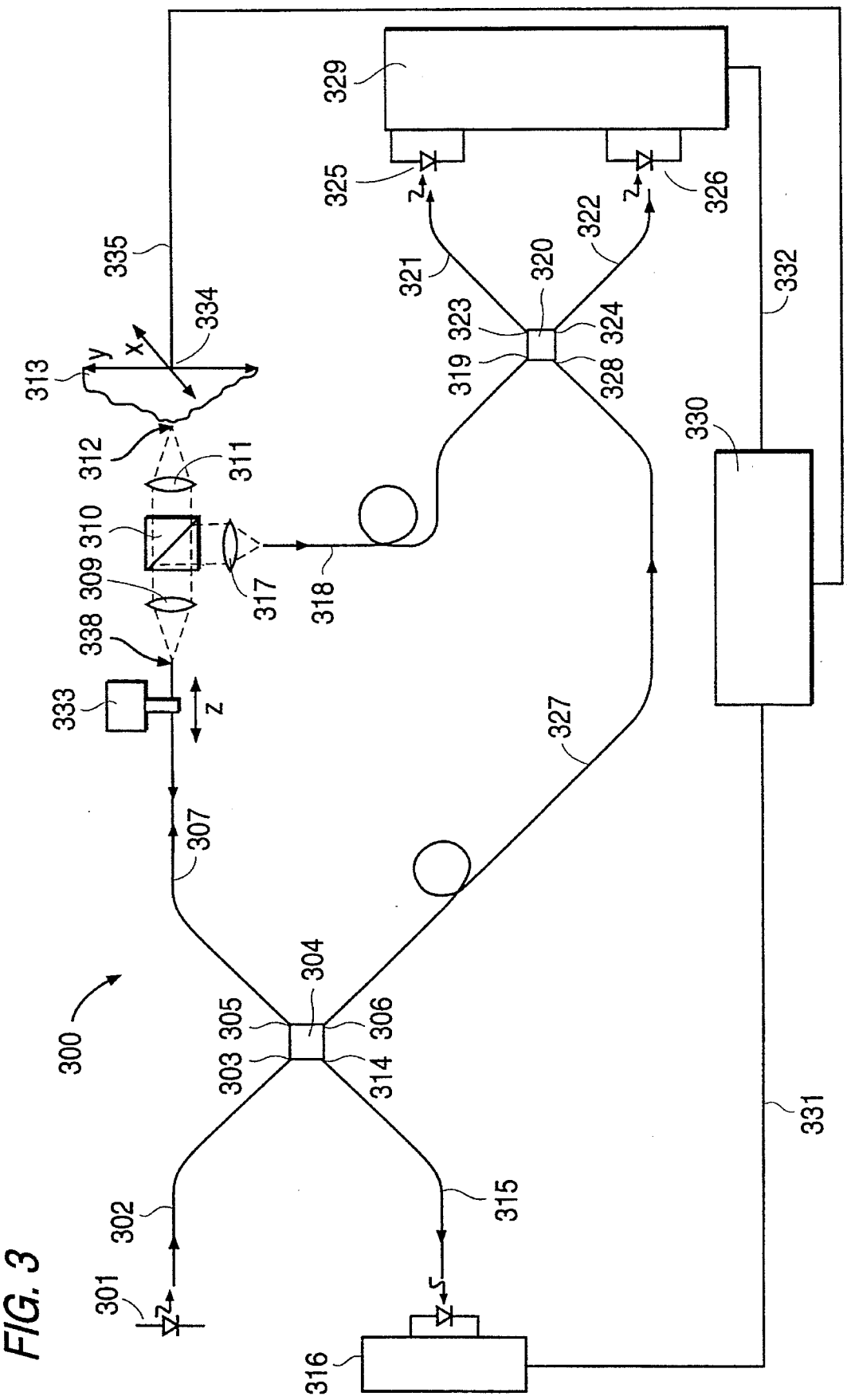
FIG. 3 is a schematic diagram of a scanning spot microscope according to the invention.

In a scanning spot microscope 300 illustrated in FIG. 3 laser diode 301 with integral single mode optical fibre pigtail 302 is fused to port 303 of directional single mode fibre coupler 304. Light from integral fibre optic pigtail 302 is split between ports 305 and 306. Substantially coherent and substantially uncollimated light emanating from single mode fibre exit end 308 of fibre 307 is collected by low numerical aperture lens 309 (typically 0.01 to 0.1) a portion passes through beam splitter 310 and is focussed by high numerical aperture lens 311 (typically 0.1 to 1.45) into a spot 312 which intersects object 313. The outgoing light resulting from interaction between the illuminating spot 312 and object 313 is collected by lens 311, passes through beam splitter 310 and is focussed by lens 309 back into fibre end 308. Outgoing light collected by the core of fibre 307 is split between ports 303 and 314 of single mode directional coupler 304. Outgoing light from port 314 passes through integral fibre optic pigtail 315 to detector 316. A portion of the light emanating from fibre end 308 is split by beam splitter 310 and focussed by high numerical aperture lens 317 into the core of single mode fibre 318. Single mode fibre 318 is fused to port 319 of directional single mode fibre coupler 320. A portion of this signal light is split between fibre optic arms 321 and 322 of coupler 320 via ports 323 and 324 respectively. Signal light from fibre optic arms 321 and 322 strikes detectors 325 and 326. Illuminating light from laser diode 301 emerging from port 306 of coupler 304 passes down reference fibre 327 to port 328 of coupler 320. A portion of this reference light is split between fibre optic arms 321 and 322 of coupler 320 via ports 323 and 324 respectively. The output signals from detectors 325 and 326 passes into calculator 329 the output of calculator 329 passes into three dimensional imager 330 via line 332. The signal from detector 316 is fed into imager 330 via line 331. Piezoelectric stack 333 moves fibre exit end 308 to and fro along its axis to scan spot 312 in and about object 313 in the z direction. Mechanical stage 334 scans the object 313 in the x and y directions. Imager 330 communicates with mechanical stage 334 via line 335.

In use coherent illuminating light from laser diode 301 passes to exit end 308 via fibre 302 port 303 coupler 304 port 305 and fibre 307. A portion of illuminating light emerging from exit end 308 is substantially coherent and substantially uncollimated and is directed by lens 309 into beam splitter 310. About 90% of the illuminating light entering beam splitter 310 passes directly through it to lens 311 where it is focussed into a spot 312 which intersects sample 313. Outgoing light resulting from the interaction between the focussed spot 312 and object 313 is collimated by lens 311 and enters beam splitter 310. The intensity of the outgoing light corresponds to the strength of the interaction between the spot 312 and object 313 at the particular spot position and can be used to characterise a particular parameter of the object at that particular position such as reflectance. Most of the outgoing light passes through beam splitter 310 to be focussed by lens 309 into the core of fibre 307 at fibre end 308. A substantial portion of this outgoing light passes to detector 316 via fibre 307, port 305 coupler 304 port 314 and fibre 315. Detector 316 detects the outgoing light and sends a signal corresponding to the intensity of outgoing light to the imager 330 via line 331. About 10% of the illuminating light entering beam splitter 310 is directed into the core of single mode fibre 318 by lens 317 and thence into coupler 320 via port 319. A portion of the coherent illuminating light from laser diode 301 passes out port 306 of coupler 304 via fibre 302 and port 303. This reference light passes along single mode fibre 327 and into coupler 320 via port 328 where it interferes with illuminating light present in coupler 320. The interference light intensity passes to detectors 325 and 326 via fibres 321 and 322 and ports 323 and 324. Detectors 325 and 326 detect interference light intensity and each output a signal to calculator 329 corresponding to the relative phase difference between the reference light and the illuminating light. If the z position of fibre end 308 changes the interference light intensity at detectors 325 and 326 also changes as a result of the change in the phase difference between the reference light and the illuminating light. This change in the phase difference is as a result of the path length change between fibre end 308 and the entrance end of fibre 318. Calculator 329 determines the z position change of fibre end 308 and hence the z position of spot 312 from the change in the interference light intensities at detectors 325 and 326.

Microscope 300 can be utilised to obtain a three dimensional image of object 313 by moving fibre end 308 to and fro along the z axis using piezoelectric stack 333 and moving object 313 in the x and y directions. The three dimensional image is captured and stored as follows. The signal at detector 316 is passed along line 331 to imager 330 which stores the value for that x y z coordinate. Piezoelectric stack 333 then moves fibre end 308 such that the phase difference measured by calculator 329 changes by a predetermined amount corresponding to a known change in the z position of fibre end 308 and a known change in the z position of spot 312. This new spot position is noted by imager 330 and the signal on detector 316 which is passed along line 331 is stored for the new x y z coordinate. This procedure is repeated for all required z positions at a given x y coordinate on object 313. Mechanical stage 334 is utilised to move object 313 so that spot 312 can be scanned in the z direction at different x y coordinates on object 313 until a three dimensional image of object 313 has been stored by imager 330.

Alternatively microscope 300 can be operated in the following manner. Fibre end 308 is oscillated sinusoidally and rapidly in order to z scan spot 312 through the surface of object 313. Thus the signals at detectors 325 and 326 take the form of sine waves with sinusoidally varying frequencies (i.e. frequency modulated sine waves). Each peak on the sine waves corresponds to a single wavelength of translation of fibre end 308. A simple way to keep track of the z position of fibre end 308 to a resolution of one wave length of the light being used is to count the peaks which correspond to the interference fringes.

Note that depending on the relationship between the characteristics of optical elements 309 and 311, one wavelength of movement of fibre end 308 may correspond to 1/100 of a wavelength of movement of diffraction limited spot 312. Thus by monitoring the intensity level at detector 316 and noting the interference signal at the time of the peak signal at detector 316 in imager 330 one can determine the position of the surface of object 313 to 1/100th of a wavelength or better. In this case it is the signal at detector 316 rather than the position of fibre end 308 that determines resolution.

Figure 6:
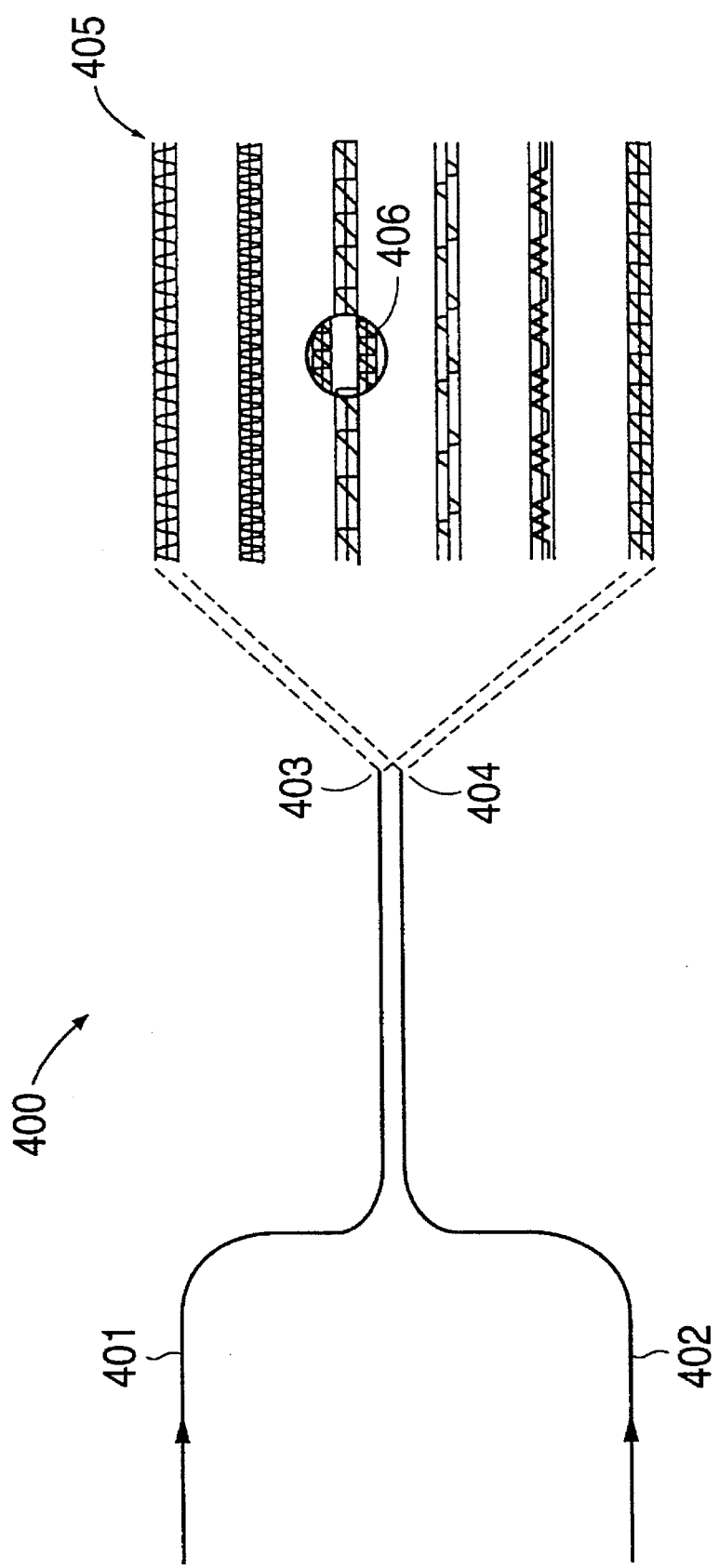
FIG. 6 is a schematic diagram of a detection system which can be used in the microscope of FIG. 3.

The detection system of FIG. 3 incorporating coupler 320 fibres 321 and 322 and detectors 325 and 326 can be replaced with detection system 400 shown in FIG. 6. Note that fibres 318 and 327 in FIG. 3 correspond to single mode fibres 401 and 402 in FIG. 6. Illuminating light from fibre 401 emerges from fibre end 403. Reference light from fibre 402 emerges from fibre end 404. Fibres 401 and 402 are substantially parallel in the vicinity of their ends. Fibre ends 403 and 404 are in close proximity to one another so that illuminating light emerging from end 403 interferes with reference light emerging from end 404 to form fringe pattern 405. As the phase of the light emerging from fibre end 403 changes with respect to that emerging from fibre end 404 fringe pattern 405 translates across dual element detector 406. If the phase change of the light emerging from fibre end 403 relative to the light emerging from fibre end 404 is positive, fringe pattern 405 moves in one direction, up say. If the phase change of the light emerging from fibre end 403 relative to the light emerging from fibre end 404 is negative fringe pattern 405 moves in the opposite direction, down say. If the fringe pattern is moving up the bottom half of dual detector 406 detects a particular feature in the signal before the top half. On the other hand, if the fringe pattern is moving down the top half of dual detector 406 detects a particular feature in the signal before the bottom half. In this manner, referring back to FIG. 3, the direction and magnitude of the z movement of fibre end 308 can be determined.

Figure 4:
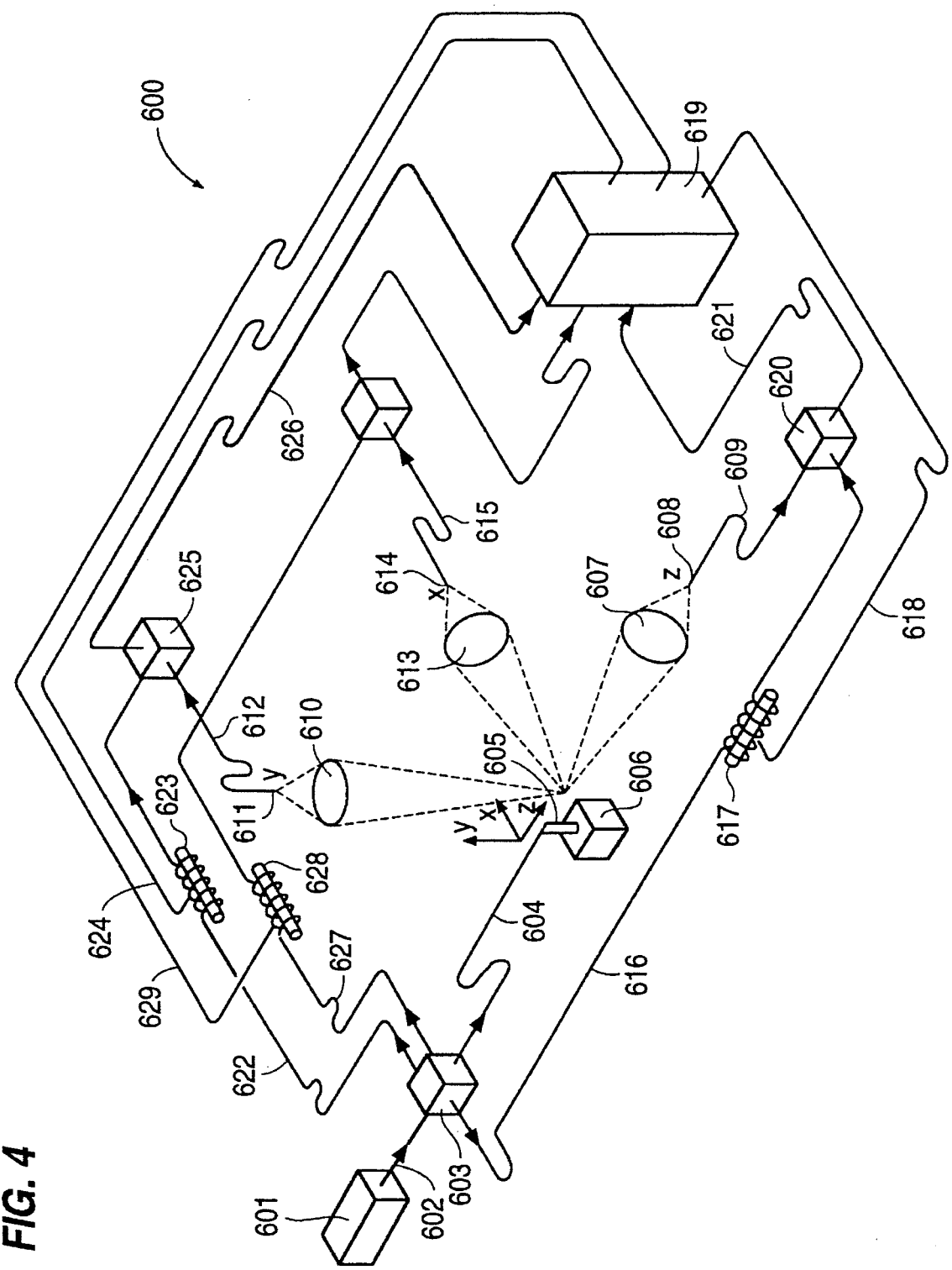
FIG. 4 is a schematic diagram of a moving fibre system according to the invention.

A moving fibre system 600 illustrated in FIG. 4 has laser 601, and coupler 603 which is linked to laser 601 by single mode optical fibre 602. Coherent illuminating light enters fibre 604 from coupler 603. Fibre 604 is attached near its exit end 605 to x y z vibrator 606. Light emerging from fibre end 605 is coherently directed in an uncollimated manner preferentially in directions x y and z. This can be done, for example, by careful geometric shaping of fibre end 605. Light directed in the z direction is collected by lens 607 and focussed into end 608 of single mode fibre 609. Light directed in the y direction is collected by lens 610 and focussed into end 611 of single mode fibre 612. Light directed in the x direction is collected by lens 613 and focussed into end 614 of single mode fibre 615. Z reference light from laser 601 is directed into single mode fibre 616 by coupler 603. Fibre 616 has along its length a piezoelectric cylinder 617 connected to detector/calculator 619 by line 618. Fibre 616 is connected to coupler 620 which in turn is coupled to detector/calculator 619 by fibre 621. Y reference light from laser 601 is directed into single mode fibre 622 by coupler 603. Fibre 622 has along its length a piezoelectric cylinder 623 connected to detector/calculator 619 by line 624. Fibre 622 is connected to coupler 625 which in turn is coupled to detector/calculator 619 by fibre 626. X reference light from laser 601 is directed into single mode fibre 627 by coupler 603. Fibre 627 has along its length a piezoelectric cylinder 628 connected to detector/calculator 619 by line 629. Fibre 627 is connected to coupler 630 which in turn is coupled to detector/calculator 619 by fibre 631. All of the fibres and couplers in device 600 are single mode coherence maintaining.

In operation coherent light from laser 601 is coupled into single mode fibre 602. Coherent light from fibre 602 enters 5 port coupler 603. A portion of this light is coherently injected into fibre 604 by coupler 603. A portion of the light emerging from fibre end 605 of fibre 604 is directed coherently in the z direction towards lens 607. Lens 607 then focusses a portion of this light into the core of fibre end 608 of single mode fibre 609. This light travels coherently along fibre 609 and enters coupler 620. Another portion of the light entering coupler 603 is injected coherently into reference fibre 616. Light travels along fibre 616 to coupler 620 where it interferes with the illuminating light from fibre 609. The light intensity resulting from the interference of light from fibres 609 and 616 is injected into fibre 621 and detected by detector/calculator 619. Detector/calculator 619 generates an error signal which is fed via line 618 to piezoelectric cylinder 617 to maintain the interferometer in quadrature by causing the piezoelectric cylinder to change diameter and thus physically alter the length of reference fibre 616. The above procedure allows one to monitor the change in the z position of fibre end 605.

The position of fibre end 605 in the x and y directions is determined in a similar manner to that described for the z direction.

X y z vibrator 606 moves fibre end 605 in the x y and/or z directions. Detector/calculator 619 determines the change in x y and/or z position of fibre end 605 as described above and stores the result. Following the above procedure system 600 can be used to scan an object in a dimensionally known manner.

Figure 5:
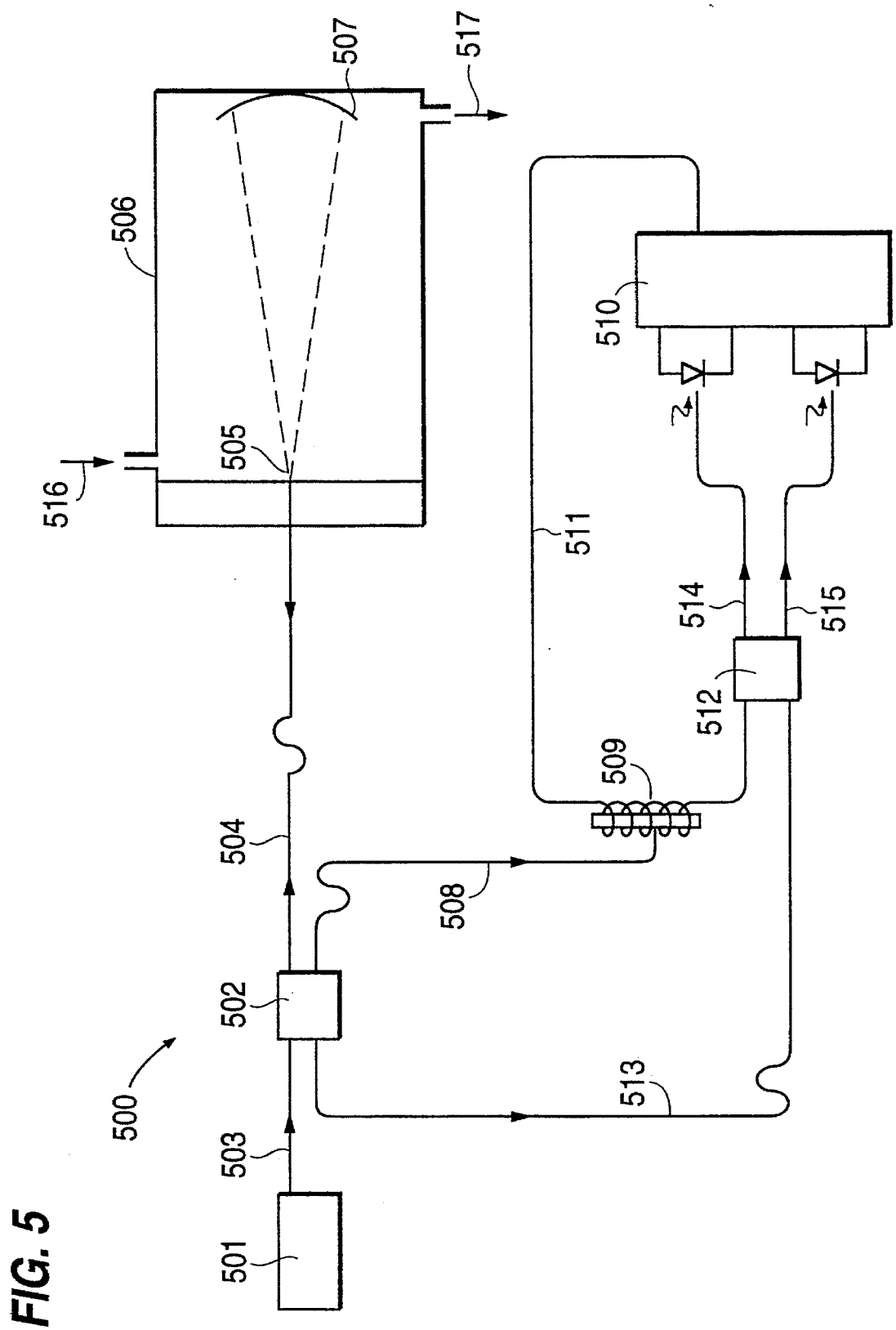
FIG. 5 is a schematic diagram of a refractometer according to the invention.

Refractometer 500 is illustrated in FIG. 5. Laser 501 is linked to coupler 502 with single mode fibre 503. Illuminating light enters fibre 504 from coupler 502 and emerges from fibre end 505 located in refractometer sample cell 506. Focussing reflector 507 is disposed in cell 506 to direct light from fibre end 505 back into the core of fibre 504 via end 505. A portion of the illuminating light entering coupler 502 is directed into fibre 508 by coupler 502. Fibre 508 is wrapped around piezoelectric cylinder 509 between coupler 502 and coupler 512. Piezoelectric cylinder 509 is connected to detector/calculator 510 by line 511. Illuminating light back reflected from mirror 507 passes through fibre 504 to coupler 502 which directs a portion into fibre 513 which is also connected to coupler 512. Coupler 512 is linked to detector/calculator 510 by optical fibres 514 and 515. Cell 506 has inlet port 516 and outlet port 517. While all of the fibres and couplers in refractometer 500 are designed for single mode operation they could equally well be multi mode fibres and couplers.

In operation coherent light from helium neon laser 501 is injected into fibre 503, directed into coupler 502 and split between illuminating fibre 504 and reference fibre 508. Illuminating light leaves the core of fibre 504 at fibre end 505. Focussing reflector 507 reflects and focusses a significant portion of the coherent uncollimated illuminating light back into the core of fibre 504 at fibre end 505. The light path between fibre end 505 and reflector 507 is contained entirely within cell 506 and the light path length depends on refractive index of the substance in cell 506 (which can be a gas or liquid for example). The back reflected light focussed into the core of fibre 504 passes into coupler 502 which directs a portion into fibre 513. The light entering fibre 513 is directed into coupler 512. Light entering reference fibre 508 passes around piezoelectric cylinder 509 into coupler 512 where it interferes with the back reflected light from fibre 513 to produce a light intensity characteristic of the phase difference between the back reflected and reference beams. The interference light intensity is injected into fibres 514 and 515 by coupler 512 and passes to detector/calculator 510. Detector/calculator 510 generates an error signal which is fed via line 511 to piezoelectric cylinder 509 to maintain the phase of the reference beam relative to the back reflected beam in quadrature by causing the piezoelectric cylinder 509 to change diameter and thus physically alter the length of fibre 508. Detector/calculator 510 determines the refractive index change of the material passing through the cell 506 from the error signal.

Figure 7:
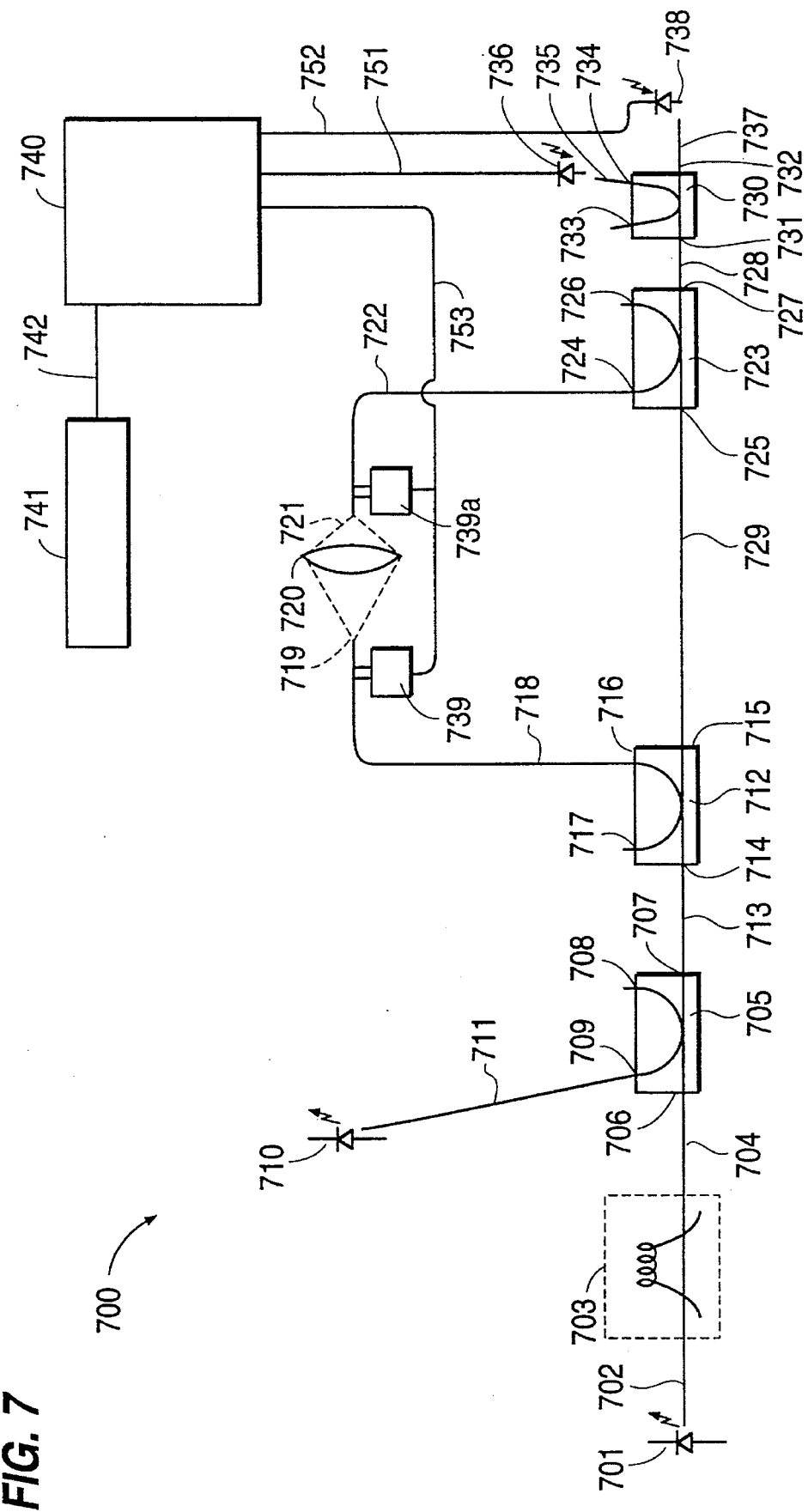
FIG. 7 is a schematic diagram of a white light interferometer analyser.

As indicated the above, the energy source utilised in the method and apparatus of the invention may be coherent or partially coherent. In a white light interferometer analyser 700 illustrated in FIG. 7, light of wavelength L1 from super luminescent diode 701 is injected into integral single mode optical fibre pigtail 702 which is connected to white light interferometer cell 703 having a path length difference between the signal and reference beams whose magnitude D depends on the strength of the parameter being measured. The output of cell 703, comprising the recombined signal and reference beams from cell 703, is injected to single mode fibre 704 which is connected via port 706 to single mode wavelength division multiplexer 705. With respect to port 706 wavelength division multiplexer 705 has wavelength L2 tap on port 709 and L1 and L2 output port 707. Port 708 is antireflection terminated. Long coherence length laser diode 710, emitting light with wavelength L2, is connected to port 709 by single mode fibre 711. Port 707 is connected to single mode wavelength independent coupler 712 via single mode fibre 713 and port 714. Coupler 712 has output ports 715 and 716 and antireflection terminated port 717. Note that multiplexer 705 could be dispensed with by injecting light from diode 710 directly into port 717. Port 716 is connected to single mode fibre 718 having exit end 719. A portion of short coherence length light of wavelength L1 and long coherence light of wavelength L2 emerges from end 719 with a numerical aperture of typically 0.1 to be collected by lens 720 and injected with high numerical aperture into entrance end 721 of single mode fibre 722 which is connected to port 724 of wavelength independent single mode fibre coupler 723 which has other entrance port 725, exit port 727 and antireflection terminated port 726. Port 715 is connected to port 725 by single mode fibre 729. Port 727 is joined to wavelength division multiplexer 730 via single mode fibre 728 and entrance port 731. With respect to entrance port 731, multiplexer 730 has wavelength L1 exit port 732, wavelength L2 exit port 734 and antireflection terminated port 733. Port 732 is connected to avalanche photodiode 738 by fibre 737. Port 734 is connected to pin diode 736 by fibre 735. End 719 can be scanned towards and away from lens 720 by scanner 739 and/or end 721 can be scanned towards and away from lens 720 by scanner 739a such that the path length difference taken by light passing from coupler 712 to coupler 723 via lens 720 and that passing via fibre 729 can at least be varied between −D and +D. Diode 736, diode 738 and scanner 739 and/or are connected to computer 740 by lines 751, 752 and 753 respectively. Computer 740 is connected to recorder 741 by line 742.

In operation, partially coherent light of average wavelength L1 from diode 701 is injected into cell 703 via fibre 702 where it is split into two beams which travel different paths with a length difference of D before being injected into fibre 704. A first portion of this L1 wavelength light is guided to end 719 via port 706, multiplexer 705, port 707, fibre 713, port 714, coupler 712, port 716 and fibre 718 from which it emerges uncollimated and piecewise coherent with a path length difference of D between the pieces and is collected with a low numerical aperture and directed with a high numerical aperture by lens 720 into end 721 of fibre 722 which guides it to coupler 723 via port 724. A second portion of the light of wavelength L1 injected into fibre 704 by cell 703 is guided to coupler 723 via port 706, multiplexer 705, port 707, fibre 713, port 714, coupler 712, port 715, fibre 729 and port 725 where it interferes with the first portion to produce temporal fringes of variable visibility which depends on the relative position of ends 719 and 721.

The result of this interference is directed to diode 738 via port 727, fibre 728, port 731, multiplexer 730, port 732 and fibre 737. The intensity of the signal produced by diode 738 is monitored by computer 740. The relative position of fibre ends 719 and 721 is determined by computer 740 by monitoring the fringes produced by interference in coupler 723 between light of wavelength L2 travelling along a first path from fibre 711 to coupler 723 via port 709, multiplexer 705, port 707, fibre 713, port 714, coupler 712, port 716, fibre 718, end 719, lens 720, end 721, fibre 722 and port 724 and a second path from fibre 711 to coupler 723 via port 709, multiplexer 705, port 707, fibre 713, port 714, coupler 712, port 715, fibre 729 and port 725. The interference signal produced in coupler 723 by light of wavelength L2 is directed to diode 736 via port 727, fibre 728, port 731, multiplexer 730, port 734 and fibre 735 where it is detected. To determine D, and thus the magnitude of the parameter being measured, computer 740 directs scanner 739 and/or 739a via line 743 to move fibre end 719 and/or 721 axially with respect to stationary lens 720 while monitoring the position of fibre end 719 and/or 721, via the signal on diode 736 via line 751, and noting the signal on diode 738 via line 752. The computer then correlates the signal from diode 738 as a function of the position of fibre end 719 and/or 721, for example through the use of Fourier transforms to obtain the path imbalance D, and thus the magnitude of the parameter being measured, very accurately. The result is recorded in recorder 741 via line 742.

INDUSTRIAL APPLICABILITY

Apparatuses and methods for measuring a change in an energy path Length according to invention facilitate the measurement of the apparent position of the end of a fibre in one, two or three dimensions, through which illuminating light emerges, relative to another object.

We claim:

1. An apparatus for measuring a change in an energy path length comprising:
   (a) an energy source having,
      (i) means for emanating a first energy beam, unguided and substantially uncollimated, wherein at least a portion of the first energy beam is substantially coherent, and
      (ii) means for coherently guiding a second energy beam to an energy interferometer;
   (b) a coherent energy director;
   (c) an energy collector;
      wherein the coherent energy director is operatively associated with both the means for emanating and the energy collector, thereby coherently directing at least a portion of the first energy beam from the means for emanating to the energy collector;
      wherein the energy collector is operatively associated with the interferometer thereby coherently directing at least a portion of the first energy beam collected by the energy collector to the interferometer whereby the collected first energy beam interferes with the second energy beam thereby producing an output signal;
   (d) means for changing an energy path length of the unguided and substantially uncollimated first energy beam between the means for emanating and the coherent energy director, thereby changing a phase of the unguided and substantially uncollimated first energy beam at the coherent energy director, the means for changing being operatively associated with the means for emanating; and
   (e) a calculator operatively associated with the interferometer to determine the change in the energy path length between the means for emanating and the coherent energy director from a change in phase of the output signal.

2. An apparatus for measuring a change in an energy path length comprising:
   (a) an energy source having,
      (i) means for emanating an unguided first energy beam wherein at least a portion of the first energy beam is substantially coherent, and
      (ii) means for coherently guiding a second energy beam to an energy interferometer;
   (b) a coherent energy director;
   (c) an energy collector;
      wherein the coherent energy director is operatively associated with both the means for emanating and the energy collector, thereby coherently directing, as a substantially uncollimated beam, at least a portion of the first energy beam from the means for emanating to the energy collector;
      wherein the energy collector is operatively associated with the interferometer thereby coherently directing at least a portion of the first energy beam collected by the energy collector to the interferometer whereby the collected first energy beam interferes with the second energy beam thereby producing an output signal;
   (d) means for changing an energy path length of the unguided and substantially uncollimated first energy beam between the coherent energy director and the energy collector, thereby changing a phase of the unguided and substantially uncollimated first energy beam at the energy collector, the means for changing being operatively associated with the energy collector; and
   (e) a calculator operatively associated with the interferometer to determine the change in the energy path length between the coherent energy director and the energy collector from a change in phase of the output signal.

3. An apparatus for measuring a change in an energy path length comprising:
   (a) an energy source having,
      (i) means for emanating a first energy beam, unguided and substantially uncollimated, wherein at least a portion of the first energy beam is substantially coherent, and
      (ii) means for coherently guiding a second energy beam to an energy interferometer;
   (b) a coherent energy director;
   (c) an energy collector;
      wherein the coherent energy director is operatively associated with both the means for emanating and the energy collector, thereby coherently directing, as a substantially uncollimated beam, at least a portion of the first energy beam from the means for emanating to the energy collector;
      wherein the energy collector is operatively associated with the interferometer thereby coherently directing at least a portion of the first energy beam collected by the energy collector to the interferometer whereby the collected first energy beam interferes with the second energy beam thereby producing an output signal;

(d) means for changing an energy path length of the unguided and substantially uncollimated first energy beam between the means for emanating and the coherent energy director, thereby changing a phase of the unguided and substantially uncollimated first energy beam at the coherent energy director, the means for changing being operatively associated with the means for emanating;

(e) means for changing the energy path length of the unguided and substantially uncollimated first energy beam between the coherent energy director and the energy collector, thereby changing a phase of the unguided and substantially uncollimated first energy beam at the energy collector, the means for changing being operatively associated with the energy collector; and (f) a calculator operatively associated with the interferometer to determine the change in the energy path length between the means for emanating and the coherent energy director and between the coherent energy director and the energy collector from a change in phase of the output signal.

4. The apparatus as defined in claim 1, 2 or 3 wherein the energy source is a solid particle beam, acoustic waves, or electromagnetic radiation.

5. The apparatus as defined in claim 1, 2 or 3 wherein the energy source is a source of electromagnetic radiation with a wavelength in the range of and including far UV to far IR.

6. The apparatus as defined in claim 1, 2 or 3 wherein the means for emanating is selected from the group consisting of an exit window of an energy source, a laser, a laser diode and a pinhole aperture in combination with a focussing element.

7. The apparatus as defined in claim 1, 2 or 3 wherein the energy source is operatively associated with an energy guide and the means for emanating is an energy exit portion of the guide.

8. The apparatus as defined in claim 1, 2 or 3 wherein the means for coherently guiding the second energy beam is an energy guide or a focussing system.

9. The apparatus as defined in claim 1, 2 or 3 wherein the coherent energy director is an energy condenser or focusser.

10. The apparatus as defined in claim 1, 2 or 3 wherein the energy collector is an aperture or an energy entrance portion of an energy guide.

11. The apparatus as defined in claim 1, 2 or 3 wherein the means for coherently guiding is an energy guide.

12. The apparatus as defined in claim 1, 2 or 3 wherein the means for coherently guiding is a coherent optical fibre bundle.

13. The apparatus as defined in claim 1, 2 or 3 wherein the means for coherently guiding is a flexible, multi mode optical fibre.

14. The apparatus as defined in claim 1, 2 or 3 wherein the means for coherently guiding is a flexible, single mode optical fibre.

15. The apparatus as defined in claim 14 wherein the numerical aperture, NA, the fibre core radius, a, and the wave length of the energy, $\lambda$, obey the relationship:

$$2 \times \pi \times NA \times a/\lambda \leq 2,405.$$

16. The apparatus as defined in claim 1, 2 or 3 wherein the energy interferometer is an energy splitter or the detecting element of a detector.

17. The apparatus as defined in claim 1, 2 or 3 wherein the means for changing the energy path between the means for emanating and the director, between the director and the collector or between the means for emanating and the director and between the director and the collector, is a scanner.

18. The apparatus as defined in claim 1, 2 or 3 wherein the energy source is a source of electromagnetic radiation with a wavelength in the range of and including far UV to far IR and the means for changing the energy path between the means for emanating and the director, between the director and the collector or between the means for emanating and the director and between the director and the collector, is a substance that changes the refractive index of the energy path of the first energy beam.

19. An apparatus for measuring a parameter using an interferometer cell, the apparatus comprising:

a first coherence maintaining energy guide which, in operation, has energy emerging in a substantially uncollimated beam coherently from its exit end;

an energy focusser, the first energy guide being operatively associated with the energy focusser so that at least a portion of the substantially uncollimated energy beam emerging from the exit end of the first energy guide falls coherently on the energy focusser; and a second coherence maintaining energy guide having an energy entrance end, the second energy guide being operatively associated with the energy focusser so that at least a portion of the substantially uncollimated energy beam falling on the energy focusser is focussed coherently onto the entrance end of the second energy guide, wherein one of the first energy guide exit end and the second energy guide entrance end is moved in response to the parameter being measured resulting in a change in the energy path between one of the energy exit end and the focusser, and the focusser and the energy entrance end, respectively, to introduce a change in phase of the substantially uncollimated energy beam such that the parameter being measured is determined based on the change in phase of the substantially uncollimated energy beam.

20. The apparatus as defined in claim 19 wherein the energy guide is an energy fibre.

21. The apparatus as defined in claim 19 wherein the first and second coherence maintaining energy guides are the same energy guide.

22. The apparatus as defined in claim 21 wherein the focusser includes a reflector.

23. A method for measuring a change in an energy path length comprising the steps of:

coherently directing, with a coherent energy director, at least a portion of a first energy beam to an energy collector from means for emanating the first energy beam from an energy source, wherein at least a portion of the first energy beam is substantially coherent, the first energy beam from the means for emanating being unguided and substantially uncollimated;

collecting at least a portion of the first energy beam with the energy collector;

coherently guiding a second energy beam from the energy source to an energy interferometer;

coherently directing at least a portion of the collected first energy beam to the interferometer whereby the collected first energy beam interferes with the second energy beam thereby producing an output signal;

changing an energy path length of the unguided and substantially uncollimated first energy beam between the means for emanating and the coherent energy director such that a change in the first energy beam at the coherent energy director is changed to produce a change in phase of the output signal; and determining the change in the energy path length between the means for emanating and the coherent energy director from the change in the phase of the output signal.

24. A method for measuring a change in an energy path length comprising the steps of:

coherently directing, with a coherent energy director, at least a portion of a first energy beam to an energy collector from means for emanating the first energy beam from an energy source, wherein at least a portion of the first energy beam is substantially coherent, the first energy beam from the coherent energy director to the energy collector being unguided and substantially uncollimated;

collecting at least a portion of the first energy beam with the energy collector;

coherently guiding a second energy beam from the energy source to an energy interferometer;

coherently directing at least a portion of the collected first energy beam to the interferometer whereby the collected first energy beam interferes with the second energy beam thereby producing an output signal;

changing an energy path length of the unguided and substantially uncollimated first energy beam between the coherent energy director and the energy collector such that a change in the first energy beam at the energy collector is changed to produce a change in phase of the output signal changes; and determining the change in the energy path length from the change in the phase of the output signal.

25. A method for measuring a change in an energy path length comprising the steps of:

coherently directing, with a coherent energy director, at least a portion of a first energy beam to an energy collector from means for emanating the first energy beam from an energy source, wherein at least a portion of the first energy beam is substantially coherent, the first energy beam from the coherent energy director to the energy collector being unguided and substantially uncollimated;

collecting at least a portion of the first energy beam with the energy collector;

coherently guiding a second energy beam from the energy source to an energy interferometer;

coherently directing at least a portion of the collected first energy beam to the interferometer whereby the collected first energy beam interferes with the second energy beam thereby producing an output signal;

changing an energy path length of the unguided and substantially uncollimated first energy beam between the means for emanating and the energy collector such that a change in the first energy beam at the energy collector is changed to produce a change in phase of the output signal changes; and determining the change in the energy path length from the change in the phase of the output signal.

26. A method for determining a parameter of an optical system which correlates to a change in an energy path length, the method comprising the steps of:

emanating a first energy beam from an energy source, the first energy beam being unguided and substantially uncollimated;

coherently directing the first energy beam from a point of emanation in the emanating step to a collection point;

collecting at least a portion of the first energy beam at the collection point as a collected first energy beam;

interfering a coherently guided second energy beam from the energy source with at least a portion of the collected first energy beam;

measuring the interference between the second energy beam and the portion of the collected first energy beam;

changing one or both of the point of emanation and the collection point to produce a change in an energy path length of the unguided and substantially uncollimated first energy beam thereby changing a phase of the first energy beam at the collection point;

determining the change in the energy path length from a change in the interference measured in the measuring step due to the change of phase of the substantially uncollimated first energy beam at the collection point; and calculating the parameter of the optical system based on a correlation between the parameter and the change in energy path length of the substantially uncollimated first energy beam.

\* \* \* \* \*